United States Patent [19]
Ditzler et al.

[11] Patent Number: 5,114,576
[45] Date of Patent: May 19, 1992

[54] PREVENTION OF CONTAMINANTS BUILDUP IN CAPTURED AND RECIRCULATED WATER SYSTEMS

[75] Inventors: Lee C. Ditzler, Diablo; Ronald Lemberger, Danville; Willam K. McGrane, Pleasanton; Jerry F. Choy, Fremont, all of Calif.

[73] Assignee: TriNeos, Dublin, Calif.

[21] Appl. No.: 595,502

[22] Filed: Oct. 11, 1990

Related U.S. Application Data

[62] Division of Ser. No. 480,722, Feb. 15, 1990.

[51] Int. Cl.$^5$ .................................................. C02F 1/78
[52] U.S. Cl. .................................. 210/195.1; 210/196; 210/199; 210/202; 210/203; 210/321.6; 210/323.1; 210/257.1; 210/259; 210/295
[58] Field of Search ................. 210/195.1, 195.2, 202, 210/203, 205, 251, 259, 323.1, 698, 701, 702, 719, 754, 760, 805, 806, 765, 321.6, 314, 650, 652, 196, 199, 638, 639, 295

[56] References Cited

U.S. PATENT DOCUMENTS

| | | | |
|---|---|---|---|
| 3,497,453 | 2/1970 | Yurdin | 210/698 |
| 4,556,493 | 12/1985 | Cuisia | 210/698 |
| 4,595,498 | 6/1986 | Cohen et al. | 210/195.2 |
| 4,793,391 | 12/1988 | Stevens et al. | 210/760 |
| 4,865,726 | 9/1989 | De Vries | 210/195.2 |

*Primary Examiner*—Stanley S. Silverman
*Assistant Examiner*—Neil M. McCarthy
*Attorney, Agent, or Firm*—Townsend and Townsend

[57] ABSTRACT

Biological decontamination and the avoidance of accumulation of dissolved solids are both achieved in captured and recirculated water systems by a continuously operating system involving the use of a chemical filtration unit, removal of dissolved solids as they are concentrated at the filtration unit, a disinfectant treatment, and the protection of the chemical filtration unit from degradation by the disinfectant where necessary.

8 Claims, 1 Drawing Sheet

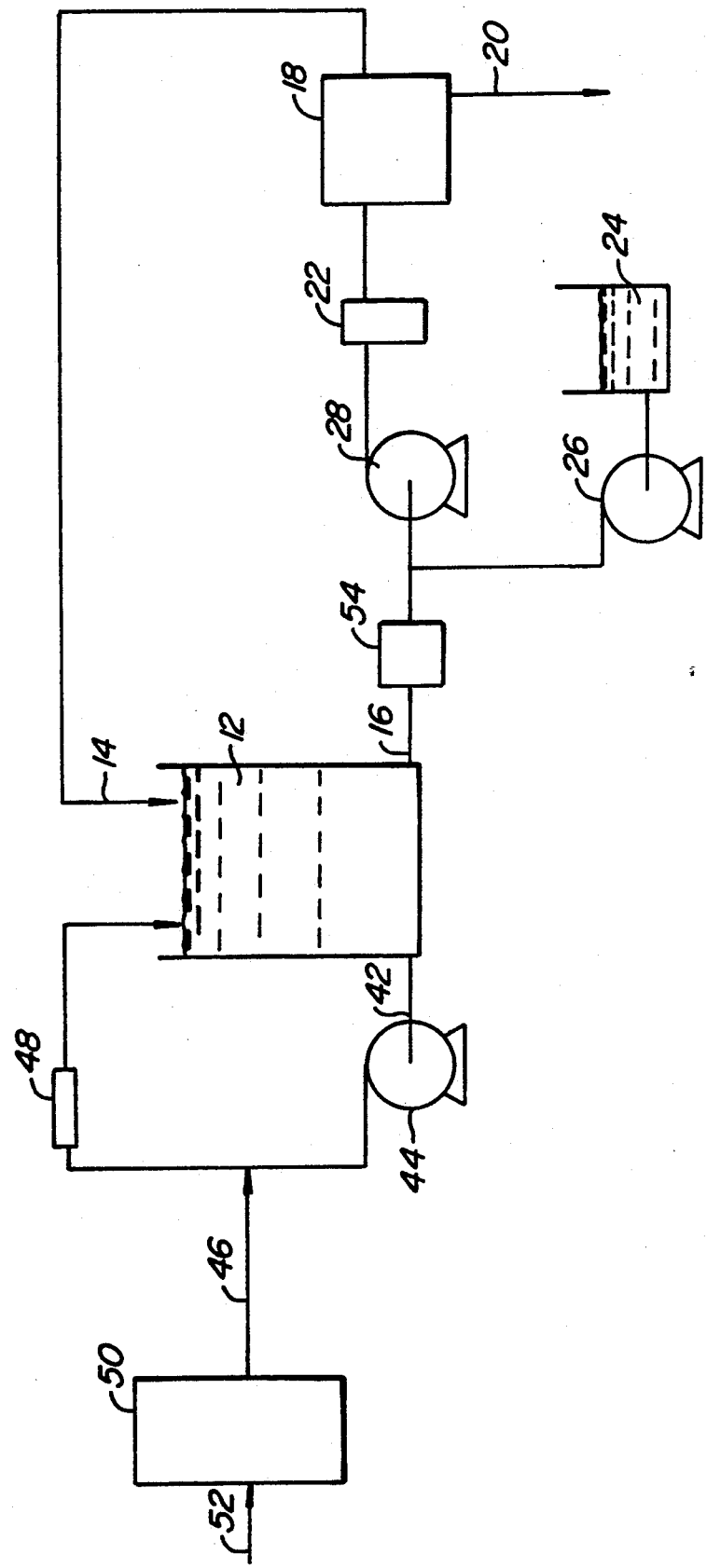

PREVENTION OF CONTAMINANTS BUILDUP IN CAPTURED AND RECIRCULATED WATER SYSTEMS

This is a Division of application Ser. No. 480,722 filed Feb. 15, 1990.

This invention lies in the field of water treatment, and in particular, in the technology of controlling contaminant levels in circulating water systems.

BACKGROUND AND SUMMARY OF THE INVENTION

Contamination is a serious problem in captured water systems and recirculated water systems. These terms refer to generally discrete bodies of water which are either stagnant for a prolonged period of time or circulated within a closed loop. Examples are cooling towers, fountains, ponds, swimming pools, and other decorative, recreational, or industrial water systems. Water is continuously lost in many of these systems due to evaporation, leakage or other escape, and the make-up water tends to increase the contaminant level since the contaminants frequently form solid deposits and do not vaporize. Deposits associated with water hardness can be lessened by using soft water, but this limits the sources of supply and increases cost by requiring additional chemicals and/or water softening equipment.

According to one aspect of the present invention, therefore, dissolved solids are removed from captured and recirculated water systems on a continuous basis by chemical filtration, with continuous removal of the contaminants as they are concentrated by the filtration.

Biological contaminants such as bacteria and other microbiological growth are controllable by a variety of known techniques. In most cases, however, these techniques are not compatible with techniques involving the removal of dissolved solids, since they involve the use of chemicals or treatments which are destructive of small pore chemical filtration means. According to another aspect of the invention, therefore, an overall system is provided which includes both biological decontamination and dissolved solids removal together with a unit for protecting the latter from agents used in the former. The longevity and continued effectiveness of the system is therefore established.

Other objects, advantages, features and aspects of the invention will be apparent from the description which follows.

BRIEF DESCRIPTION OF THE DRAWING

The drawing appended hereto is a flow sheet of a captured water system combined with units for both biological decontamination and the removal of dissolved solids, integrated into a single interrelated system. This is one example of a system embodying the invention.

DETAILED DESCRIPTION OF THE INVENTION AND PREFERRED EMBODIMENTS

The invention is best illustrated by the detailed description of one example, as represented by the drawing appended hereto. The following will address each of the elements and components in the drawing, with the understanding that this description is applicable to captured and recirculated water systems in general.

The body of water to be treated is one which is known in the industry as either a captured body of water or a recirculated water system. These are overlapping terms, and are generally used herein to include all systems where a body of water is used on a continuous basis with possible cycling or recycling. It is common in these systems for small amounts of water to be lost during normal use and possibly replaced with make-up water. The majority of water in these systems however is retained. Examples of such systems are fountains, cascades, ponds and waterfalls using recycled water, swimming pools and other types of recreational water systems, and cooling towers and other circulating coolant systems used in either residential, commercial or industrial operations. Included in each of these systems is a reservoir or basin 12 for temporarily holding at least a portion of the water in a relatively quiescent state.

Discharging into the reservoir 12 is a water stream 14, which is treated by the mineral impurities removal system which forms one aspect of the present invention. This stream may be any of several streams, depending on the water system and its particular needs. For example, it may be the return line of a circulating side stream taken off the reservoir itself for the express purpose of the mineral impurities removal. Alternatively, it may be a feed stream of make-up water from an external source, compensating for losses in the system. As a further example, it may be the return line of one of the functioning circulation loops of the system, such as a fountain, cascade, waterfall, or spray loop or cooling coil. The impurities removal may be performed on any of these streams, either upstream or downstream of any other units in the stream, such as pumps, spray nozzles, or heat exchangers. The appropriate choice in any particular system will depend on the type and number of recirculation loops already present in the system, the flow rates of water passing through them and volumes of water retained in them relative to the remainder of the system, the presence and type of other units in the system, and other factors readily apparent to those skilled in the art. Appropriate placement of the units which comprise the present invention in any given system will be within the routine skill of a water system design engineer.

In the system shown in the drawing, the water stream 14 is the return line of a side stream 16 taken off the reservoir solely for purposes of purification. Dissolved solids removal is achieved in this stream by a chemical filtration unit 18. The species removed in this unit are those which enter the system by being dissolved in the original supply water or the make-up water, as well as species which become dissolved in the water during use of the system itself. These species will otherwise tend to accumulate and build up in the system as the water by which they enter the system evaporates, leaving them behind.

The chemical filtration unit 18 may be any of a variety of elements capable of removing or concentrating the dissolved solids. Examples are filters, membranes and packed beds. Examples of the filtration mechanism are ultrafiltration membranes, microfiltration membranes, nanofiltration membranes, and reverse osmosis membranes. It is recognized that some of these terms are overlapping, but their meaning will be recognized by those skilled in the filtration art. One example of an effective membrane is Desal-5, available from Desalination Systems, Inc., Escondido, Calif. This membrane is a thin-film nanofiltration membrane with an approximate molecular weight cut-off of 100 to 150 for uncharged organic molecules and a high rejection of multivalent, including divalent, anions and cations.

The chemical filtration unit 18 concentrates the dissolved species which do not pass through it. To maintain the filtration capacity of the unit on a continuous basis, the concentrated species are removed from the system in a discharge stream 20, which contains a small portion of the water in the side stream 16. This discharge stream 20 may be a continuous bleed stream or may be a stream which is periodically or intermittently bled from the filtration unit, either timed by instrumentation or done manually by an operator. The discharge will then be disposed of in an environmentally acceptable manner.

To further maintain the filtration capabilities of the chemical filtration unit 18, a particle filter 22 is included upstream of the unit. Any of the wide variety of particle filters commercially available may be used. Size, capacity, configuration and pore size may vary, depending on the needs of the overall system. A typical pore size is 5-10$\mu$, although other sizes may be more appropriate for certain systems. Typical examples are the RBX-A, RBX-A2L and NCX-100 filter bags, available from American Felt and Filter Company, Newburgh, N.Y.

Still further maintenance of the filtration capabilities of the chemical filtration unit is achieved by the addition of a chemical agent to facilitate the removal of the concentrated species at the filter surface. In the system shown in the drawing, the agent is fed by a source 24 or reservoir containing an aqueous solution of the agent. The agent is generally a water-soluble organic chemical agent which serves either as a flocculating agent, coagulating agent, chelating agent or dispersant, and which prevents or minimizes the formation of scale at the filter surface. Polymers functioning in this manner include high molecular weight anionic, cationic and nonionic polyelectrolytes such as polyacrylates, poly(styrene sulfonate), poly(diallyldimethylammonium chloride), and poly(ethylene oxide), as well as low molecular weight polyacrylates. Examples of nonpolymeric species are organic phosphonates such as (1-hydroxyethylidene)disphosphonic acid. The actual chemical nature of the agent is not critical, and any of the wide variety of chemicals available on the market may be used. An example is FLOCON Antiscalant 100, a polyacrylate available from Pfizer Chemical Division, New York, N.Y., described as a liquid polymer designed to inhibit mineral scale formation in reverse osmosis water purification systems. Other examples will be apparent to those skilled in the membrane and filter art.

The chemical agent may be fed continuously into the side stream, as through a continuously operating pump 26 as shown in the drawing. Alternatively, the agent may be fed intermittently or periodically, either by automatic control or manual operator control. Selection of the amount fed is within the routine skills of the experienced water systems engineer, and the appropriate amount will vary with the requirements of the system. A typical system, for example, may involve feeding a solution formed by dissolving thirty ounces of an antiscalant such as FLOCON Antiscalant 100 plus thirty ounces of 5% sodium sulfite in 15 gallons of circulating water. A typical feed rate of such a solution into the side stream 16 shown in the drawing may be 0.003 gallons per minute of the antiscalant solution per 1 to 2 gallons per minute of the side stream flow.

Circulation of the side stream 16 is achieved by conventional means, such as the pump 28 shown in the drawing.

The removal of dissolved solids as described above is frequently accompanied by a system for control of biological fouling. Such a system is often used to eliminate or control bacteria and other microorganisms which tend to proliferate in captured or recirculated water systems. Biological fouling control may be achieved by any of the various methods known in the art. This includes irradiation by ultraviolet light or the addition to the system of microbicidal chemicals such as ozone, chlorine or bromine. Various configurations and arrangements of these systems, of which numerous examples are known in the art, may be used.

A preferred method of biological fouling control is ozone injection or ozonization. One example of a system configuration for ozonization is shown in the drawing. In this example, a second side stream 42 is drawn off the reservoir 12, and circulated by a pump 44 through a loop which returns the stream to the reservoir.

Ozone gas is injected into the side stream 42 by a conduit 46, using a venturi (not shown) or other conventional gas injection means. To further enhance the mixing and dissolving of the ozone into the water before it reaches the reservoir 12, a static or dynamic mixer 48 of conventional design may be included in the side stream 42 downstream of the venturi.

The ozone gas is generated on site. An ozone generator 50 which forms ozone from oxygen in an oxygen-containing gas 52 may be installed. The oxygen-containing gas may of course be air or oxygen itself, or any mixture of gases including oxygen, and the generator 50 may be any of various designs known in the literature and the industry. An electrically operated generator, particularly one utilizing corona discharge with simultaneous or alternating cooling, is of particular utility. Detailed descriptions of such generators are found in Ditzler, et al., U.S. Pat. No. 4,877,588, issued Oct. 31, 1989, and Ditzler, et al., U.S. patent application Ser. No. 07/421,600, filed Oct. 11, 1989. The disclosures of each of these two documents are incorporated herein by reference.

The use of ozonization systems such as those described in the preceding paragraph may be optimized by the use of a continuous monitoring system which monitors the level of ozone in the reservoir 12. This will avoid unpleasant odors and environmental hazards arising from excess ozone levels, and also maintain an effective ozone level to assure continuous disinfectant activity. A closed loop monitoring and control system (not shown in the drawing), may therefore be included. Such a system may include a device for continuously or periodically monitoring the level of dissolved ozone in the reservoir 12, or in the portion of the side stream 42 close to the point where the stream leaves the reservoir, the device generating a signal representative of the ozone level to a controller which compares the signal to a set point and sends an appropriate signal to the ozone generator 50 to control the voltage and hence the rate of ozone conversion. The monitoring device may be of any suitable mechanism or principle. Examples include instruments operating under the principle of potassium iodide oxidation, instruments utilizing polarographic determinations, and instruments measuring oxidation-reduction potential. All such instruments are known among those skilled in the art and various instruments of this type are commercially available.

For systems which include ozonization in addition to the chemical filtration unit, it is advisable to take steps to remove ozone from the water stream flowing toward the filtration unit. This will avoid chemical degradation of the filtration membrane by the ozone.

Ozone removal may be achieved by any of the conventional systems known in the art. In the system shown in the drawing, ozone removal from the chemical filtration side stream 16 is achieved by an ozone destruction unit 54 positioned immediately downstream of the point where the stream is drawn from the reservoir 12. Examples of units which serve this function are filters and fixed beds of particles of materials which absorb ozone or promote its conversion to oxygen. Specific examples are activated carbon and manganese dioxide. One example of a commercial product among many which can be used is CARULITE 200, a product of Carus Chemical, Cincinnati, Ohio. Ozone destruction may also be achieved by sodium sulfite ($NaSO_3$) injection.

The foregoing is offered primarily for purposes of illustration, with an emphasis on preferred embodiments. Various modifications and substitutions still within the spirit and scope of the invention will be readily apparent to those skilled in the art.

What is claimed is:

1. A system for the combined control of levels of biological organisms and dissolved mineral impurities in a body of water, said system comprising:
   first circulating means for drawing a first side stream from, and recirculating said first side stream back to, said body of water;
   ozonation means for treating said first side stream with ozone to kill substantially all organisms present therein;
   second circulating means for drawing a second side steam from, and recirculating said second side stream back to, said body of water;
   chemical filter means in said second side stream for concentrating said dissolved mineral impurities;
   a source of an organic chemical agent tending to enhance dispersion of mineral precipitating from said dissolved mineral impurities;
   a bed member selected from the group consisting of activated carbon, manganese dioxide and a combination thereof, in said second side stream at a location upstream of said chemical filter means, for eliminating substantially all ozone therein; and
   impurities removing means for removing said dissolved mineral impurities concentrated by said chemical filter means.

2. A system in accordance with claim 1 in which said bed comprises a bed of manganese dioxide.

3. A system in accordance with claim 1 in which said chemical filter means is a membrane, and said system further comprises particle filter means in said stream upstream of said chemical filter means to prevent particles in said water from reaching said membrane.

4. A system for the combined control of levels of biological organisms and dissolved mineral impurities in a body of water, said system comprising:
   first circulating means for drawing a first side stream from, and recirculating said first side stream to, said body of water;
   ozonation means for treating said first side stream to kill substantially all organisms present therein;
   second circulating means for drawing a second side stream from, and recirculating said second side stream back to, said body of water;
   chemical filter means in said second side stream for concentrating said dissolved mineral impurities;
   ozone elimination means in said second side stream at a location upstream of said chemical filter means, for eliminating substantially all ozone therein,
   a source of an organic chemical agent tending to enhance dispersion of mineral precipitating from said dissolved mineral impurities;
   means for continuously introducing said organic chemical agent from said source to said second side stream at a point upstream of said chemical filter means, to cause dispersion of minerals precipitating from said dissolved mineral impurities at said chemical filter means; and
   impurities removing means for removing said dispersed precipitated minerals and said dissolved chemical impurities concentrated by said chemical filter means.

5. A system in accordance with claim 4 in which said organic chemical agent is a polyacrylate, and said chemical filter means is a membrane selected from the group consisting of nanofiltration membranes, ultrafiltration membranes and reverse osmosis membranes.

6. A system in accordance with claim 4 in which said ozone elimination means comprises a bed of a member selected from the group consisting of activated carbon, manganese dioxide and a combination thereof.

7. A system in accordance with claim 4 in which said ozone elimination means comprises a bed of manganese dioxide.

8. A system, in accordance with claim 4 in which said chemical filter means is a membrane, and said system further comprises particle filter means in said second side stream upstream of said chemical filter means to prevent particles in said water from reaching said membrane.

* * * * *